3,086,964
CATALYTIC POLYMERIZATION OF α-OLEFINS TO SOLID POLYMERS WITH CATALYST MIXTURES OF A METAL, A METAL TETRAALKYL, AND A TITANIUM TETRAHALIDE
Frederick B. Joyner and Newton H. Shearer, Jr., Kingsport, Tenn., assignors to Eastman Kodak Company, Rochester, N.Y., a corporation of New Jersey
No Drawing. Filed Nov. 29, 1955, Ser. No. 549,839
21 Claims. (Cl. 260—93.7)

This invention relates to a new and improved polymerization process and is particularly concerned with the use of novel catalysts for preparing high molecular weight solid poly-α-olefins of high density and crystallinity. More specifically, the invention is concerned with improved processes for polymerizing olefins such as ethylene, propylene, or mixtures thereof, to give polymers having densities much higher than those achieved by high pressure polymerization processes, without the necessity of employing the extremely high temperature and pressure conditions necessary heretofore.

The commercial polyethylene prepared by high pressure polymerization techniques, although useful for a variety of applications, has a relatively low softening temperature and is too flexible for many uses. This high pressure polyethylene is characterized by a relatively high degree of chain branching and a density which is considerably lower than the theoretical density. Usually, pressures in excess of 500 atmospheres and commonly of the order of 1000–1500 atmospheres are employed to effect the polymerization to solid polymer. Such pressures have been necessary even with the use of oxygenated catalysts such as the peroxides.

For many years, olefins have been polymerized to give low molecular weight liquid polymers. Some success has attended scattered efforts to form solid polymers at low pressures and temperatures using various catalytic materials, but the results thereby obtained by use of catalytic materials have been almost completely unpredictable. Thus, a minor change in the nature of the catalytic material often has meant the difference between obtaining a low molecular weight liquid polymer and a high molecular weight solid polymer. Furthermore, some of the catalysts which would result in formation of solid polymer, did so only at extremely high pressures and hence offered little advantage over the usual high pressure polymerization processes wherein flexible low density polymers were obtained.

This invention is concerned with and has for an object to provide improved processes whereby α-monoolefins are readily polymerized by catalytic means to give high molecular weight solid polymers of improved softening temperature, density, crystallinity and stiffness. A particular object of the invention is to provide an improved process for preparing a wide variety of poly-α-olefins at pressures ranging from atmospheric pressure up to relatively high pressures and at temperatures ranging from —60° C. to about 150° C. Another object of the invention is to provide an improved method for making polyethylene, polypropylene, or ethylene-propylene copolymers having such improved characteristics.

These and other objects which will be apparent from the description and claims which follow are attained by means of the process embodying the present invention wherein α-monoolefins, either singly or in admixture, are readily polymerized to high molecular weight solid polymers by effecting the polymerization in the presence of a catalytic mixture of (1) aluminum, zinc or magnesium metal, (2) tetraalkyl lead, tetraalkyl tin or tetraalkyl silane wherein each alkyl group contains 1–12 carbon atoms, and (3) a titanium tetrahalide which is preferably titanium tetrachloride or tetrabromide. The process embodying the invention depends upon the combination of all three components of the mixture in order to achieve catalytic activity. Thus, we have found that a tetraalkyl lead, tin or silane in combination with titanium tetrachloride or similar tetrahalide does not act as a low temperature, low pressure catalyst for the polymerization of ethylene or similar monomer to solid polymer. Furthermore, aluminum, zinc or magnesium in combination with either of the other catalyst components individually is likewise not effective as a catalyst to obtain solid polymer. In contrast to this, the three component catalyst mixtures embodying this invention have excellent catalytic activity and give solid, highly crystalline, high density olefin polymers even at very low temperatures and pressures. It is thus apparent that the polymerization of α-olefins to form solid, high density polymers depends upon rather specific catalyst combinations, and the reasons why the specific mixtures defined herein work so effectively while other combinations do not is not readily understood. For example, if the titanium tetrahalide is replaced by a titanium tetraalkoxide, such as titanium tetrabutoxide, the resulting catalyst mixture is almost completely useless. Similarly, tetraalkyl silanes work effectively in the catalyst combinations herein defined whereas these same materials are much less effective when employed in combination with a titanium tetrahalide and aluminum chloride or similar halogen derivative of the aluminum, zinc or magnesium metals employed herein. The alkyl groups of the lead, tin or silicon compounds can be any of the alkyl groups containing 1–12 carbon atoms and can be different alkyl groups if desired. For convenience, however, the alkyl groups are desirably the same, and the lower alkyl groups are preferred for economic reasons and for convenience and availability. Nevertheless, the higher alkyl groups containing more than 4 carbon atoms such as the hexyl, octyl, decyl and dodecyl groups form excellent catalysts with the lead, tin or silicon. The titanium compound employed must be a titanium tetrahalide in order to achieve the desired results, and the preferred tetrahalides are titanium tetrachloride and titanium tetrabromide. The aluminum, zinc or magnesium is used in the form of the free metal, preferably in finely divided form whereby the metal can be readily dispersed in the polymerization mixture and maintained in homogeneous fashion by agitation. The inventive process is carried out in liquid phase in an inert organic liquid and preferably an inert liquid hydrocarbon vehicle. The process proceeds with excellent results over a temperature range from as low as —60° C. to as high as 150° C. Ordinarily, temperatures within the range of —20° C. to 130° C. are preferred for optimum results. The pressure can be varied as desired, with pressures as low as atmospheric pressure being completely operable and pressures of 100 p.s.i. or higher being desirably employed in some cases, pressures of as much as 20,000 p.s.i. or higher being desirably used in some instances. For most commercial operations, pressures of 50–700 p.s.i. are preferred and give optimum yields of desirable polymer. The liquid vehicle employed is desirably one which serves both as a liquid medium and a solvent for the solid polymerization products at the temperature of polymerization.

The invention is applicable for polymerizing any of the well known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired.

When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747–50) of at least 50,000 p.s.i.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-monoolefins and particularly with propylene. Other monoolefins which are suitably employed either alone or in admixtures include such materials as n-butylene, isobutylene, 1-pentene, 1-decene, and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

In the practice of the invention the aluminum, zinc or magnesium metal is employed in powered form whereby it is readily dispersed in the polymerization mixture. The metal tetraalkyls herein defined are well known in the art and can be prepared by any of the well known methods. Similarly, the titanium tetrahalides are well known. The catalytic activity does not depend upon any particular method of preparation and consequently no special methods or activation processes need be employed.

The only limitation on the temperature at which the process can be effected is the decomposition temperature of the catalyst. The pressure employed is usually only sufficient to maintain the reaction mixture in liquid form during the polymerization. The catalyst mixtures except for the metal employed are readily soluble in the organic liquid vehicles commonly employed and hence the uniformity of reaction can be readily controlled. The exact nature of the catalytic action between those components of the catalytic mixture is not understood. The extreme activity of the catalytic mixture is shown by the fact that the polymerization proceeds readily at temperatures as low as −60° C. and atmospheric pressure. The combination of catalysts results in polymerization to solid polymer in substantial yields in periods of from a few minutes to a few hours. The metal tetraalkyls and the titanium tetrahalides are usually readily soluble in the reaction vehicle, whereas the finely divided metal powder is readily maintained in a homogeneous dispersion by agitation of the reaction mixture.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from −60° C. to 150° C. can be employed as desired, the usual process adapted for commercial production is carried out at a temperature in the range of from 20° C. to 130° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 50 to 700 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 4% by weight in the vehicle. The concentration of the monomer in the vehicle will vary rather widely depending upon the reaction conditions and will usually range from about 2 to 50% by weight, or preferably from about 2 to about 10% by weight based on the weight of the vehicle. Concentrations of monomer in the vehicle of about 3–7% by weight are commonly employed. Higher concentrations of monomer ordinarily increase the rate of polymerization. Concentrations above 5–10% by weight are ordinarily less desirable because the polymer dissolved in the reaction medium results in a very viscous solution.

The ratio of the individual components of the catalyst mixture to each other can be varied rather widely. Thus the ratios of the three components to each other can be varied anywhere within the range of from 1:4 to 4:1 molar equivalents. Preferably the relative proportions of the metal tetraalkyl to the powdered metal is in the ratio of 1:4 to 4:1 whereas the ratio of the metal or tetraalkyl compound to the titanium tetrahalide is in the range of 1:2 to 4:1 or higher. These ratios represent the preferred range of operations and for convenience equimolar amounts or equal amounts by weight of the three components of the catalyst system can be used with excellent results. The preferred concentration of catalyst is in the range of 0.1 to 4% by weight of the metal tetraalkyl based on the weight of the liquid reaction vehicle, although lower or higher concentrations can be employed to produce the highly crystalline polymers desired. The polymerization time can be varied as desired and usually will be of the order of from 30 minutes to several hours in batch processes with polymerization times of 1–4 hours commonly being employed. When a continuous process is employed, the contact time in the polymerization zone can also be regulated as desired, and in some cases it is not necessary to employ reaction or contact times much beyond one-half to one hour since a cyclic system can be employed involving precipitation of the polymer and return of the vehicle and unused catalyst to the charging zone wherein the catalyst can be replenished and additional monomer introduced.

The organic vehicle employed can be an aliphatic alkane or cycloalkyl such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

*Example 1*

Into a pressure reactor flushed with dry nitrogen was charged 100 parts by weight of dry heptane, 1 part by weight of tetraethyl lead, 1 part by weight of titanium tetrachloride and 1 part by weight of aluminum powder. This mixture was attached to an ethylene source and agitated for a period of 4 hours at room temperature and 30 p.s.i. ethylene pressure. The solid polyethylene thereby formed was isolated by the addition of 50 parts by volume of ethyl alcohol to the polymerization mixture. The precipitated solid polymer was washed with ethanol containing 10% by weight of concentrated hydrochloric acid and then washed with water and dried in a circulating air oven. The solid polyethylene thereby obtained amounted to 7 parts by weight of polymer having an inherent viscosity of 1.50 which corresponds to a molecular weight of approximately 53,000. This solid polyethylene had an average crystallinity of about 90% and contained less than ½ percent of chain branching. The density of the product was of the order of 0.95, and the softening temperature was above 130° C. The polymer had a tensile strength in excess of 3000 p.s.i. and a stiffness under flex at 5% deflection of more than 50,000 p.s.i Due to its relative stiffness, the polymer showed excellent utility in the preparation of molded articles and could also be readily extruded to form sheets and films of excellent quality. High strength fibers could be spun from the molten polymer.

*Example 2*

A mixture of 1 part by weight of tetraethyl lead, 1 part by weight of titanium tetrabromide and 1 part by weight of aluminum powder in 100 parts by weight of heptane was shaken under an ethylene pressure of 30 p.s.i. at room temperature for 2 hours. Thereafter the temperature was raised gradually over a half-hour period to 90° C. and held there for 2 hours. The yield of high molecular weight solid polyethylene having the characteristics described in the preceding example was 10 parts by weight.

*Example 3*

Although the powered metal employed is desirably aluminum, either zinc or magnesium can be substituted therefor. Thus, a good yield of high molecular weight solid polyethylene was obtained by shaking a mixture of 1 g. of tetraethyl lead, 1 g. of zinc powder, 1 g. of titanium tetrachloride and 100 ml. of heptane under an ethylene pressure of 30 p.s.i. for a period of one hour at room temperature and two hours at 90° C. In similar fashion a good yield of solid polyethylene was obtained using the same procedure but employing 1 g. of magnesium powder instead of the zinc powder and effecting the polymerization at room temperature for 6 hours.

*Example 4*

Because of the ready dispersion of the metal powder in the polymerization mixture, the process can also be carried out in a continuous flowing stream. Thus, a 4% solution of ethylene in dry heptane was continuously introduced into a tubular reactor concurrently with equimolar dispersions of aluminum powder, tetraethyl lead and titanium tetrachloride. The concentration of the tetraethyl lead was about 1% of the weight of the reaction vehicle. This mixture was continuously passed through the tubular reactor with a contact time of about an hour at a temperature of about 90° C. Solid polyethylene was formed continuously in excellent yield, and the polymerization mixture was recycled through the system after removal of the polymer. By close control of the composition of the polymerization mixture and the rate of addition and withdrawal as well as the polymerization temperature, solid polyethylene of extremely uniform composition resulted.

*Example 5*

A mixture of 100 parts by weight of heptane, 1 part by weight of tetraethyl tin, 1 part by weight of aluminum powder, and 1 part by weight of titanium tetrachloride was shaken under an ethylene pressure of 30 p.s.i. at room temperature for 2 hours, after which the temperature was raised gradually over a half-hour period to 90° C. and held there for 3 hours under 30–50 p.s.i. ethylene pressure. A good yield of high molecular weight solid polyethylene was obtained, amounting to 10 parts by weight.

*Example 6*

The process of the preceding example was followed using a catalytic mixture consisting of 2 parts by weight of tetraethyl silane, 1 part by weight of aluminum powder, and 1 part by weight of titanium tetrachloride. As before, a good yield of high molecular weight solid polyethylene was obtained.

*Example 7*

The procedure of Example 2 was followed using 100 ml. of toluene as a solvent and a catalytic mixture consisting of 1 g. of tetraethyl silane, 1 g. of zinc dust and 1 g. of titanium tetrachloride. A good yield of high molecular weight solid polyethylene was obtained after 2 hours at room temperature under 30 p.s.i. ethylene pressure and 2 hours at 90° C. under an ethylene pressure of 30–50 p.s.i.

*Example 8*

The catalyst mixtures described in the preceding examples were also employed in similar proportions for preparing high molecular weight solid polymers from propylene, 1-butene, 1-pentene and similar α-olefins. Copolymers of ethylene and propylene in all proportions were also readily prepared, and the properties of the copolymers ranged from that of the polyethylene to a more rubbery polymer with concentrations of propylene above 20% by weight and particularly above 50% by weight. Copolymers of ethylene and propylene showed particular utility as molding materials.

Similar results are obtained with other polymerization mixtures as described herein. The polymers thus obtained can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected within the spirit and scope of the invention as described hereinabove and as defined in the appended claims.

We claim:

1. In the polymerization of aliphatic α-monoolefinic hydrocarbon material containing 2–10 carbon atoms to form solid polymer, the improvement which comprises effecting the polymerization in the presence of a catalyst mixture comprising (1) a metal from the group consisting of aluminum, zinc and magnesium, (2) a compound of the formula M(R)$_4$ wherein M is from the group consisting of lead, tin and silicon and R is an alkyl group of 1–12 carbon atoms, and (3) a titanium tetrahalide, the molar ratio of said compound M(R)$_4$ to said metal being in the range of from 1:4 to 4:1, the molar ratio of said titanium tetrahalide to each of the other cataylst components being from 1:4 to 2:1.

2. In the polymerization of at least one α-monoolefin from the group consisting of ethylene and propylene to form solid polymer, the improvement which comprises effecting the polymerization in an inert organic liquid vehicle and in the presence of a catalytic mixture of aluminum metal, tetraalkyl lead wherein each alkyl group contains 1–12 carbon atoms, and a titanium tetrahalide, the molar ratio of said tetraalkyl lead to said aluminum being in the range of from 1:4 to 4:1, the molar ratio of said titanium tetrahalide to each of said aluminum metal and tetraalkyl lead being in the range of from 1:4 to 2:1.

3. In the polymerization of at least one α-monoolefin from the group consisting of ethylene and propylene to form solid polymer, the improvement which comprises effecting the polymerization in an inert organic liquid vehicle and in the presence of a catalytic mixture of aluminium metal, tetraalkyl tin wherein each alkyl group contains 1–12 carbon atoms, and a titanium terahalide, the molar ratio of said titanium tetrahalide to said tetraalkyl tin being in the range of from 1:4 to 4:1, the molar ratio of said titanium tetrahalide to each of the other catalyst components being in the range of from 1:4 to 2:1.

4. In the polymerization of at least one α-monoolefin from the group consisting of ethylene and propylene to form solid polymer, the improvement which comprises effecting the polymerization in an inert organic liquid vehicle and in the presence of a catalytic mixture of aluminum metal, tetraalkyl silane wherein each alkyl group contains 1–12 carbon atoms, and a titanium tetrahalide, the molar ratio of said tetraalkyl silane to said aluminum metal being in the range of from 1:4 to 4:1, the molar ratio of said titanium tetrahalide to each of the other of said cataylst components being in the range of from 1:4 to 2:1.

5. In the polymerization of at least one α-monoolefin from the group consisting of ethylene and propylene to form solid polymer, the improvement which comprises effecting the polymerization in an inert organic liquid vehicle and in the presence of a catalytic mixture of zinc metal, tetraalkyl lead wherein each alkyl group contains 1–12 carbon atoms and a titanium tetrahalide, the molar ratio of said tetraalkyl lead to said zinc metal being in the range of from 1:4 to 4:1, the molar ratio of said titanium tetrahalide to each of the other of said catalyst components being in the range of from 1:4 to 2:1.

6. In the polymerization of at least one α-monoolefin from the group consisting of ethylene and propylene to form solid polymer, the improvement which comprises effecting the polymerization in an inert organic liquid vehicle and in the presence of a catalytic mixture of magnesium metal, tetraalkyl lead wherein each alkyl group contains 1–12 carbon atoms and a titanium tetrahalide, the molar ratio of said tetraalkyl lead to said magnesium metal being in the range of from 1:4 to 4:1, the molar ratio of said titanium tetrahalide to each of the other of said catalyst components being in the range of from 1:4 to 2:1.

7. In the polymerization of at least one α-monoolefin from the group consisting of ethylene and propylene to form solid polymer, the improvement which comprises effecting the polymerization in dispersion in an inert liquid hydrocarbon and in the presence of a catalytic mixture of substantially equimolar proportions of aluminum metal, tetraethyl lead and titanium tetrachloride.

8. In the polymerization of at least one α-monoolefin from the group consisting of ethylene and propylene to form solid polymer, the improvement which comprises effecting the polymerization in dispersion in an inert liquid hydrocarbon and in the presence of a catalytic mixture of substantially equimolar proportions of aluminum metal, tetraethyl lead and titanium tetrabromide.

9. In the polymerization of at least one α-monolefin from the group consisting of ethylene and propylene to form solid polymer, the improvement which comprises effecting the polymerization in dispersion in an inert liquid hydrocarbon and in the presence of substantially equimolar proportions of aluminum metal, tetraethyl silane and titanium tetrachloride.

10. The process which comprises progressively introducing into a polymerization zone a polymerization mixture of substantially constant composition comprising an inert organic liquid vehicle, at least one aliphatic α-monoolefinic hydrocarbon containing 2-10 carbon atoms in a concentration soluble in said vehicle, and a catalytic mixture of a metal from the group consisting of aluminum, zinc, and magnesium, a compound of the formula $M(R)_4$ wherein M is a member of the group consisting of lead, tin and silicon and R is an alkyl group of 1-12 carbon atoms, and a titanium tetrahalide, maintaining said polymerization mixture in said zone at a substantially constant temperature in the range of from —60° C to 130° C. for a time sufficient for substantial formation of solid polymer, and progressively withdrawing the resulting mixture from said zone in amounts correlated to the amounts of polymerization mixture being introduced whereby the relative proportions of the various components in said polymerization zone remain substantially unchanged during said process, the molar ratio of said compound $M(R)_4$ to said metal being in the range of from 1:4 to 4:1, the molar ratio of said titanium tetrahalide to each of the other of said catalyst components being in the range of from 1:4 to 2:1.

11. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of a metal from the group consisting of aluminum, zinc and magnesium, a compound of the formula $M(R)_4$ wherein M is a member of the group consisting of lead, tin and silicon and R is an alkyl group of 1-12 carbon atoms, and a titanium tetrahalide, maintaining said polymerization mixture in said zone in liquid dispersion at a substantially constant temperature in the range of from —20° C. to 80° C. and for a time sufficient for substantial formation of solid polymer, and progressively and continuously withdrawing the resulting mixture from the said zone at a substantially constant rate equivalent to the rate of introduction of said polymerization mixture whereby the relative proportions of the various components in said zone remain substantially unchanged during said process, the molar ratio of said compound $M(R)_4$ to said metal being in the range of from 1:4 to 4:1, the molar ratio of said titanium tetrahalide to each of the other of said catalyst components being in the range of from 1:4 to 2:1.

12. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum metal, tetraalkyl lead wherein each alkyl group contains 1-12 carbon atoms, and a titanium tetrahalide, maintaining said polymerization mixture in said zone in liquid dispersion at a substantially constant temperature in the range of from —20° C. to 80° C. and for a time sufficient for substantial formation of solid polymer, and progressively and continuously withdrawing the resulting mixture from the said zone at a substantially constant rate equivalent to the rate of introduction of said polymerization mixture whereby the relative proportions of the various components in said zone remain substantially unchanged during said process.

13. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum metal, tetraalkyl tin wherein each alkyl group contains 1-12 carbon atoms, and a titanium tetrahalide, maintaining said polymerization mixture in said zone in liquid dispersion at a substantially constant temperature in the range of from —20° C. to 80° C. and for a time sufficient for substantial formation of solid polymer, and progressively and continuously withdrawing the resulting mixture from the said zone at a substantially constant rate equivalent to the rate of introduction of said polymerization mixture whereby the relative proportions of the various components in said zone remain substantially unchanged during said process.

14. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum metal, tetraalkyl silane wherein each alkyl group contains 1-12 carbon atoms and a titanium tetrahalide, maintaining said polymerization mixture in said zone in liquid dispersion at a substantially constant temperature in the range of from —20° C. to 80° C. and for a time sufficient for substantial formation of solid polymer, and progressively and continuously withdrawing the resulting mixture from the said zone at a substantially constant rate equivalent to the rate of introduction of said polymerization mixture whereby the relative proportions of the various components in said zone remain substantially unchanged during said process.

15. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum metal, tetraethyl lead, and titanium tetrachloride, maintaining said polymerization mixture in said zone in liquid dispersion at a substantially constant temperature in the range of from —20° C. to 80° C. and for a time sufficient for substantial formation of solid polymer, and progressively and continuously withdrawing the resulting mixture from the said zone at a substantially constant rate equivalent to the rate of introduction of said polymerization mixture whereby the relative proportions of the various components in said zone remain substantially unchanged during said process.

16. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum metal, tetraethyl lead and titanium tetrabromide, maintaining said polymerization mixture in said zone in liquid dispersion at a substantially constant temperature in the range of from —20° C. to 80° C. and for a time sufficient for substantial formation of solid polymer, and progressively and continuously withdrawing the resulting mixture from the said zone at a substantially constant rate equivalent to the rate of introduction of said polymerization mixture whereby the relative proportions of the various components in said zone remain substantially unchanged during said process.

17. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of aluminum metal, tetraethyl tin, and titanium tetrachloride, maintaining said polymerization mixture in said zone in liquid dispersion at a substantially constant temperature in the range of from −20° C to 80° C. and for a time sufficient for substantial formation of solid polymer, and progressively and continuously withdrawing the resulting mixture from the said zone at a substantially constant rate equivalent to the rate of introduction of said polymerization mixture whereby the relative proportions of the various components in said zone remain substantially unchanged during said process.

18. The process which comprises progressively and continuously introducing into a polymerization zone at a substantially constant rate a polymerization mixture of substantially constant composition comprising an inert liquid hydrocarbon vehicle, at least one α-monoolefin from the group consisting of ethylene and propylene in a concentration soluble in said vehicle, and a catalytic mixture of substantially equimolar proportions of zinc metal, tetraethyl silane, and titanium tetrachloride, maintaining said polymerization mixture in said zone in liquid dispersion at a substantially constant temperature in the range of from −20° C. to 80° C. and for a time sufficient for substantial formation of solid polymer, and progressively and continuously withdrawing the resulting mixture from the said zone at a substantially constant rate equivalent to the rate of introduction of said polymerization mixture whereby the relative proportions of the various components in said zone remain substantially unchanged during said process.

19. In the polymerization of aliphatic α-monoolefinic hydrocarbons containing 2–10 carbon atoms to solid polymers, the improvement which comprises effecting the polymerization in the presence of a catalyst consisting essentially of (1) aluminum, (2) a compound of the formula $M(R)_4$ wherein M is selected from the group consisting of lead and tin and R is an alkyl group and (3) a titanium tetrahalide.

20. In the polymerization of ethylene to solid polymer, the improvement which comprises effecting the polymerization in the presence of a catalyst consisting essentially of (1) aluminum, (2) a compound of the formula $M(R)_4$ wherein M is selected from the group consisting of lead and tin and R is an alkyl group and (3) a titanium tetrahalide.

21. In the polymerization of an olefinic hydrocarbon selected from the group consisting of ethylene and propylene to solid polymers, the improvement which comprises effecting the polymerization in the presence of a catalyst consisting essentially of (1) magnesium, (2) a compound of the formula $M(R)_4$ wherein M is selected from the group consisting of lead and tin and R is an alkyl group and (3) a titanium tetrahalide.

References Cited in the file of this patent

UNITED STATES PATENTS

| | | |
|---|---|---|
| 2,721,189 | Anderson | Oct. 18, 1955 |

FOREIGN PATENTS

| | | |
|---|---|---|
| 534,792 | Belgium | Jan. 31, 1955 |
| 874,215 | Germany | Apr. 20, 1953 |